(12) United States Patent
Zhao et al.

(10) Patent No.: US 11,468,776 B2
(45) Date of Patent: Oct. 11, 2022

(54) TECHNIQUES FOR LOCATION ACCESS MANAGEMENT IN A MOVABLE OBJECT ENVIRONMENT

(71) Applicant: SZ DJI TECHNOLOGY CO., LTD., Shenzhen (CN)

(72) Inventors: Jian Zhao, Shenzhen (CN); Shunnian Li, Shenzhen (CN); Changjian Xu, Shenzhen (CN); Yu Chen, Shenzhen (CN); Chang Geng, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 314 days.

(21) Appl. No.: 16/216,128

(22) Filed: Dec. 11, 2018

(65) Prior Publication Data

US 2019/0122565 A1     Apr. 25, 2019

Related U.S. Application Data

(63) Continuation of application No. PCT/CN2016/085620, filed on Jun. 13, 2016.

(51) Int. Cl.
*G08G 5/00* (2006.01)
*H04W 4/021* (2018.01)
*H04W 12/64* (2021.01)
*H04W 4/029* (2018.01)
*H04W 12/06* (2021.01)

(52) U.S. Cl.
CPC ......... *G08G 5/0013* (2013.01); *G08G 5/0039* (2013.01); *G08G 5/0069* (2013.01); *H04W 4/021* (2013.01); *H04W 4/029* (2018.02); *H04W 12/64* (2021.01); *H04W 12/06* (2013.01)

(58) Field of Classification Search
CPC .... G08G 5/0013; G08G 5/0039; G08G 5/006; G08G 5/0069; H04W 12/00503; H04W 12/00504; H04W 12/06; H04W 12/0609; H04W 48/04; H04W 48/08; H04W 4/029; H04W 4/024; H04W 4/021; H04W 40/02; H04W 40/20; B64C 2201/00
See application file for complete search history.

(56) References Cited

U.S. PATENT DOCUMENTS 9,348,333 B1    5/2016  Buchmueller et al.
10,672,226 B2*  6/2020  Pierce, II ............ G07F 17/3244
(Continued)

FOREIGN PATENT DOCUMENTS

CN    102298799 A    12/2011
CN    104809918 A    7/2015
(Continued)

OTHER PUBLICATIONS

The World Intellectual Property Organization (WIPO) International Search Report and Written Opinion for PCT/CN2016/085620 dated Feb. 21, 2017 5 pages.

*Primary Examiner* — Russell Frejd
*Assistant Examiner* — Brandon Z Willis
(74) *Attorney, Agent, or Firm* — Anova Law Group, PLLC

(57) ABSTRACT

A method for providing location access management includes requesting access data from an access manager based on location data associated with a movable object, receiving the access data determining accessibility of one or more regions to the movable object, and sending the access data to the movable object via a connection to the movable object.

25 Claims, 15 Drawing Sheets

(56) References Cited

U.S. PATENT DOCUMENTS

| | | | | |
|---|---|---|---|---|
| 2016/0360360 A1* | 12/2016 | Jones | ................... | G08G 5/0069 |
| 2017/0278409 A1* | 9/2017 | Johnson | ............... | G08G 5/0013 |
| 2017/0303082 A1* | 10/2017 | Jones | ................. | H04L 67/2814 |
| 2017/0358212 A1* | 12/2017 | Godwin | ............... | G08G 5/0082 |

FOREIGN PATENT DOCUMENTS

| | | |
|---|---|---|
| CN | 104932525 A | 9/2015 |
| CN | 105247593 A | 1/2016 |
| CN | 105259916 A | 1/2016 |
| EP | 2211324 B1 | 10/2013 |

\* cited by examiner

500

| Field | Range |
|---|---|
| 502 area_id | integer |
| 504 lat | float among (-90, 90) |
| 506 lng | float among (-180,180) |
| 508 country | integer |
| 510 begin_at | timestamp |
| 512 end_at | timestamp |
| 514 type | integer |
| 516 shape | integer |
| 518 level | integer |
| 520 updated_at | timestamp |
| 522 city | string |
| 524 name | string |
| 526 points | text format |

FIG. 5

| Level | Zone | Color | Restrictions |
|---|---|---|---|
| Level 0 | Open Zones | Green | No access restrictions |
| Level 1 | Authorization Zones | Yellow | Access may be granted with credential |
| Level 2 | Restricted Zones | Red | Access Restricted |
| Level 3 | Enhanced Warning Zones | Green | Warning message for users Agreement to access terms |

| Type | Code No. | Level | Zone | Shape |
|---|---|---|---|---|
| Airport | 0 | 2 | Restricted Zones | Circle |
| Special zones | 1 | 2 | Restricted Zones | Circle or Polygon |
| Military zones | 2 | 2 | Restricted Zones | Circle or Polygon |
| Commercial airports | 11 | 1 | Authorization Zones | Icon |
| Recreational airports | 13 | 1 | Authorization Zones | Circle |
| National Parks | 20 | 0 | Open Zones | Icon |
| Power plants | 23 | 0 | Open Zones | Circle |
| Prisons | 24 | 2 | Restricted Zones | Circle |
| Schools | 25 | 0 | Open Zones | Icon |
| Stadiums | 26 | 1 | Authorization Zones | Circle |
| Prohibited special use | 27 | 3 | Enhanced Warning Zones | Circle or Polygon |
| Restricted special use | 28 | 3 | Enhanced Warning Zones | Circle or Polygon |
| Temporary flight restrictions | 29 | 1 | Authorization Zones | Circle or Polygon |
| Nuclear power plants | 30 | 2 | Restricted Zones | Circle |

FIG. 7

TECHNIQUES FOR LOCATION ACCESS MANAGEMENT IN A MOVABLE OBJECT ENVIRONMENT

CROSS-REFERENCE TO RELATED APPLICATION

This application is a continuation of International Application No. PCT/CN2016/085620, filed on Jun. 13, 2016, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE DISCLOSURE

The disclosed embodiments relate generally to techniques managing location access in a movable object environment and more particularly, but not exclusively, to a software development kit for location access management.

BACKGROUND

Aerial vehicles such as unmanned aerial vehicles (UAVs) can be used for performing surveillance, reconnaissance, and exploration tasks for various applications. However, UAVs fly into areas where their presence is unexpected or into controlled airspaces. Although traditional methodology can be used to limit the areas in which UAVs may operate, these systems rely on predefined restricted areas which may not reflect the current status of a given area. Additionally, these systems typically lack flexibility and interoperability.

SUMMARY

Described herein are techniques for location management in a movable object environment. A location manager can request, from an access manager, access data based on location data associated with a movable object. The location manager can receive the access data determining accessibility of one or more regions to the movable object. The access data can then be sent to the movable object via a connection to the movable object.

Also described herein are systems and methods for location access management in a movable object environment. A location manager can receive position data corresponding to an unmanned aerial vehicle (UAV). Geo-fencing data can then be obtained based on the position data from an access manager. The geo-fencing data can be sent to the UAV via a connection to the UAV. An access state associated with the UAV can be obtained indicating an access level of a current location of the UAV. The access state can be sent to an application executing on a client device, and the application can be caused to display a message based on the access state.

BRIEF DESCRIPTION OF DRAWINGS

FIG. 5 illustrates an example data structure representing locations where access is managed in a movable object environment, in accordance with various embodiments of the present disclosure.

FIG. 6 illustrates an example of an access level model, in accordance with various embodiments of the present disclosure.

FIG. 7 illustrates an example of location types and corresponding access levels, in accordance with various embodiments of the present disclosure.

DETAILED DESCRIPTION

The disclosure is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one.

The following description of the disclosure describes location access management for a movable object. For simplicity of explanation, an unmanned aerial vehicle (UAV) is generally used as example of a movable object. It will be apparent to those skilled in the art that other types of movable objects can be used without limitation.

In accordance with various embodiments of the present disclosure, a location access management system is provided that includes geo-fencing and geo-fencing unlocking systems. Geo-fencing data (also referred to herein as access data) can be used to prevent movable objects from entering restricted areas. Additionally, in some embodiments, areas near restricted areas can be configured to trigger warnings. For example, if a movable object enters a zone within five miles (or any other predetermined distance) of a restricted zone, a proximity warning may be displayed. If the user continues to approach the restricted zone, the user may be required to verify his or her identity. For example, a zone within one and a half miles of a restricted zone may require such verification to enter.

In various embodiments, a location manager enables these geo-fencing services to be integrated with multiple applications. A location manager can request, from an access manager, access data based on location data associated with a movable object. The location manager can receive the access data determining accessibility of one or more regions to the movable object. The access data can then be sent to the movable object via a connection to the movable object.

Figure 1:
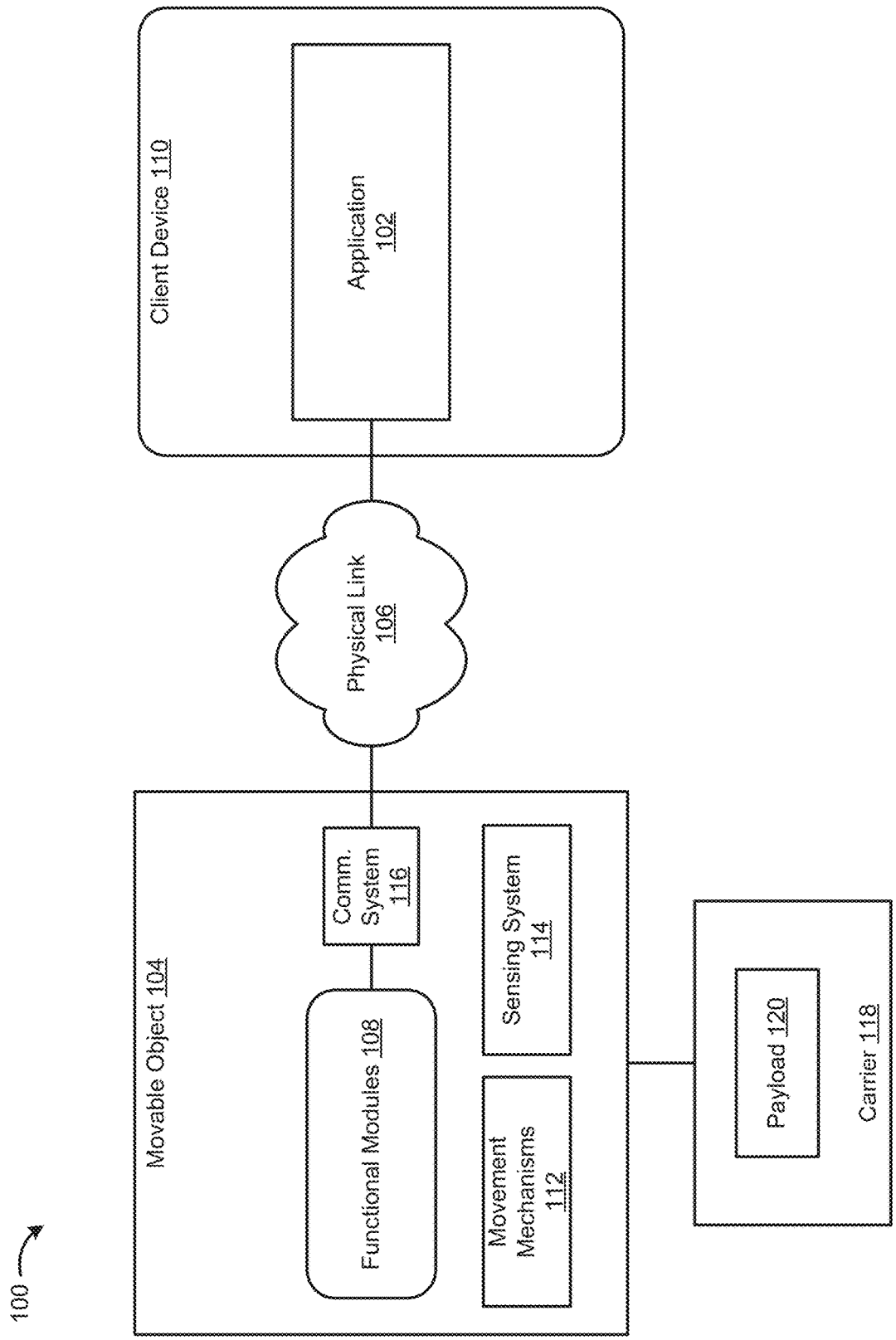
FIG. 1 illustrates an example of an application in a movable object environment, in accordance with various embodiments of the present disclosure.

FIG. 1 illustrates an example of an application in a movable object environment 100, in accordance with various embodiments of the present disclosure. As shown in FIG. 1, an application 102 in a movable object environment 100 can communicate with a movable object 104 via a physical link 106. The movable object 104 can be an unmanned aircraft, an unmanned vehicle, a handheld device, and/or a robot.

In accordance with various embodiments of the present disclosure, the movable object 104 can include various functional modules 108. For example, an unmanned aircraft can include a camera module, a battery module, a gimbal module a communication module, and a flight controller module, etc.

As shown in FIG. 1, the application 102 can be deployed on a client device 110. For example, the client device 110 can be a portable personal computing device, a smart phone, a remote control, and/or a personal computer.

Additionally, the client device 110 can include a communication device (not shown), which is responsible for handling the communication between the application 102 on the client device 110 and various modules 108 on the movable object 104. For example, an unmanned aircraft can include uplink and downlink. The uplink can be used for transmitting control signals, the down link can be used for transmitting media or video stream.

In accordance with various embodiments of the present disclosure, the physical link 106 can be (part of) a network, which is based on various wireless technologies, such as the WiFi, Bluetooth, 3G/4G, and other radio frequency technologies. Furthermore, the physical link 106 can be based on other computer network technologies, such as the internet technology.

In various embodiments, movable object 104 in a movable object environment 100 can include a carrier and a payload. Although the movable object 104 is described generally as an aircraft, this is not intended to be limiting, and any suitable type of movable object can be used. One of skill in the art would appreciate that any of the embodiments described herein in the context of aircraft systems can be applied to any suitable movable object (e.g., a UAV). In some instances, the payload may be provided on the movable object 104 without requiring the carrier.

In accordance with various embodiments of the present disclosure, the movable object 104 may include one or more movement mechanisms 112 (e.g. propulsion mechanisms), a sensing system 114, and a communication system 116. The movement mechanisms 112 can include one or more of rotors, propellers, blades, engines, motors, wheels, axles, magnets, nozzles, animals, or human beings. For example, the movable object may have one or more propulsion mechanisms. The movement mechanisms may all be of the same type. Alternatively, the movement mechanisms can be different types of movement mechanisms. The movement mechanisms 112 can be mounted on the movable object 104 (or vice-versa), using any suitable means such as a support element (e.g., a drive shaft). The movement mechanisms 112 can be mounted on any suitable portion of the movable object 104, such on the top, bottom, front, back, sides, or suitable combinations thereof.

In some embodiments, the movement mechanisms 112 can enable the movable object 104 to take off vertically from a surface or land vertically on a surface without requiring any horizontal movement of the movable object 104 (e.g., without traveling down a runway). Optionally, the movement mechanisms 112 can be operable to permit the movable object 112 in hover in the air at a specified position and/or orientation. One or more of the movement mechanisms 104 may be controlled independently of the other movement mechanisms, for example by application 102. Alternatively, the movement mechanisms 112 can be configured to be controlled simultaneously. For example, the movable object 104 can have multiple horizontally oriented rotors that can provide lift and/or thrust to the movable object. The multiple horizontally oriented rotors can be actuated to provide vertical takeoff, vertical landing, and hovering capabilities to the movable object 104. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 104 (e.g., with respect to up to three degrees of translation and up to three degrees of rotation).

The sensing system 114 can include one or more sensors that may sense the spatial disposition, velocity, and/or acceleration of the movable object 104 (e.g., with respect to various degrees of translation and various degrees of rotation). The one or more sensors can include any of the sensors, including GPS sensors, motion sensors, inertial sensors, proximity sensors, or image sensors. The sensing data provided by the sensing system 112 can be used to control the spatial disposition, velocity, and/or orientation of the movable object 104 (e.g., using a suitable processing unit and/or control module). Alternatively, the sensing system 112 can be used to provide data regarding the environment surrounding the movable object, such as weather conditions, proximity to potential obstacles, location of geographical features, location of manmade structures, and the like.

The communication system 116 enables communication with application 102 executing on client device 110 via physical link 106, which may include various wired and/or wireless technologies as discussed above. The communication system 116 may include any number of transmitters, receivers, and/or transceivers suitable for wireless communication. The communication may be one-way communication, such that data can be transmitted in only one direction. For example, one-way communication may involve only the movable object 104 transmitting data to the application 102, or vice-versa. The data may be transmitted from one or more transmitters of the communication system 110 to one or more receivers of the client device, or vice-versa. Alternatively, the communication may be two-way communication, such that data can be transmitted in both directions between the movable object 104 and the client device 102. The two-way communication can involve transmitting data from one or more transmitters of the communication system 116 to one or more receivers of the client device 110, and vice-versa.

In some embodiments, the application 102 can provide control data to one or more of the movable object 104, carrier 118, and payload 120 and receive information from one or more of the movable object 104, carrier 118, and payload 120 (e.g., position and/or motion information of the movable object, carrier or payload; data sensed by the payload such as image data captured by a payload camera; and data generated from image data captured by the payload camera). In some instances, control data from the application may include instructions for relative positions, movements, actuations, or controls of the movable object, carrier, and/or payload. For example, the control data may result in a modification of the location and/or orientation of the movable object (e.g., via control of the movement mechanisms 112), or a movement of the payload with respect to the movable object (e.g., via control of the carrier 118). The control data from the application may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). Although embodiments may be described that include a camera or other image capture device as payload, any payload may be used with embodiments of the present disclosure. In some embodiments, application 102 may be configured to control a particular payload.

In some instances, the communications from the movable object, carrier and/or payload may include information from one or more sensors (e.g., of the sensing system 114 or of the payload 120) and/or data generated based on the sensing information. The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier, and/or payload. Such information from a payload may include data captured by the payload or a sensed state of the payload.

Figure 2:
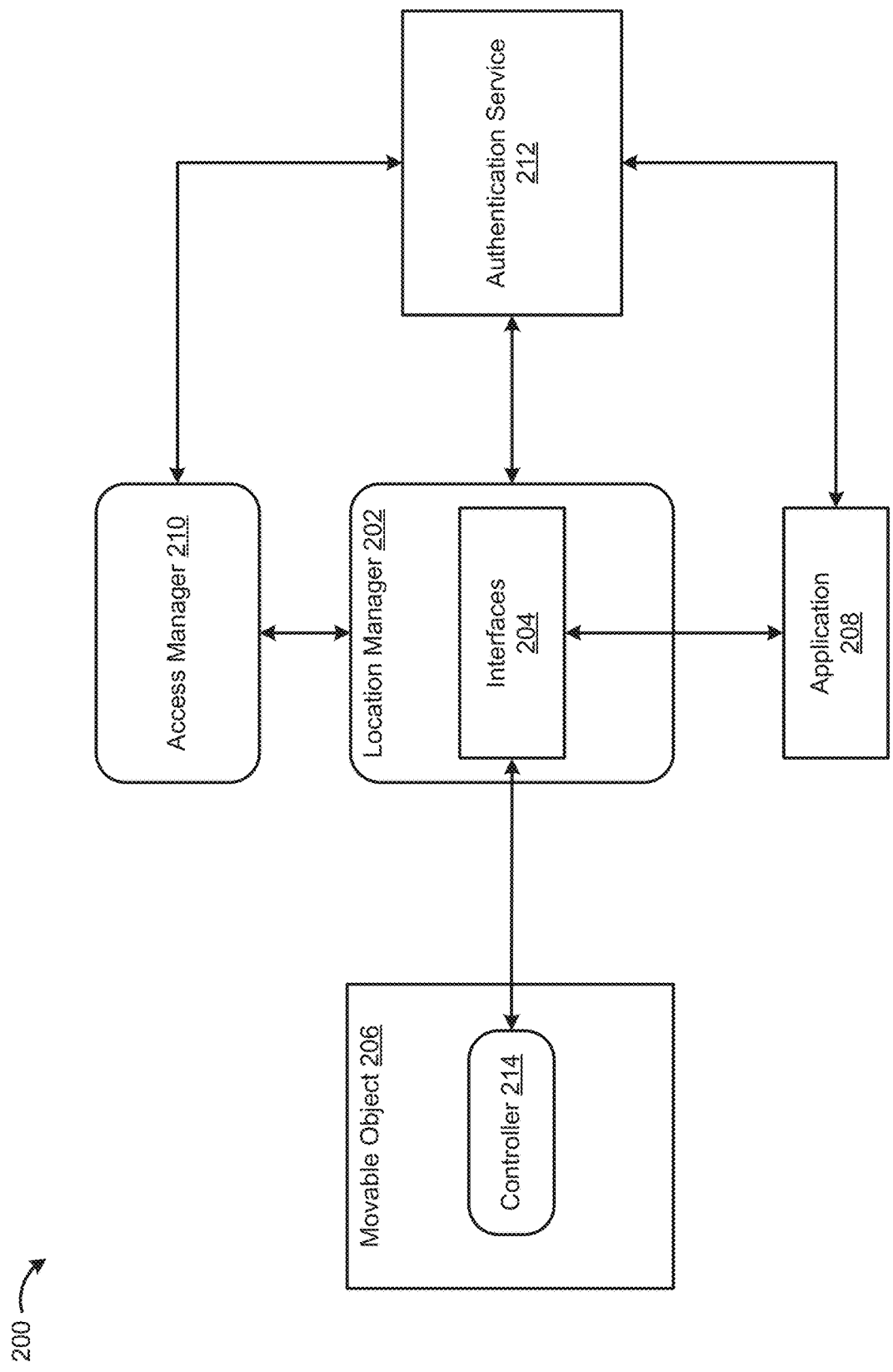
FIG. 2 illustrates an example system for location access management in a movable object environment, in accordance with embodiments of the present disclosure.

FIG. 2 illustrates an example system 200 for location access management in a movable object environment, in accordance with embodiments of the present disclosure. As shown in FIG. 2, a location manager 202 can include interfaces 204 that enable the location manager to interface with various entities, including a movable object 206, one or more applications 208, an access manager 210, and an authentication service 212. Although depicted as distinct entities, this is for simplicity of description, and it would be apparent to one of ordinary skill in the art that the functionality represented by the various entities can be combined into fewer entities or divided across more entities.

In some embodiments, movable object 206 can include a controller 214 that can control the movement and navigation of the movable object, including restricting the movement of the movable object 206 based on access data received from location manager 202. Controller 214 can obtain location data for the movable object (e.g., using a GPS or other location module) and compare the location data to the access data. The access data can include representations of various regions within a threshold distance of the movable object (e.g., within range of the movable object). The movable object can determine an access state based on the comparison, and cause the access state to be displayed.

In various embodiments, application 208 can request updated access data when the application is started. This enables the geo-fencing data to be kept up to date. In some embodiments, the geo-fencing areas can be updated in real-time and/or at regular intervals. Access manager 210 can distribute access data to a plurality of drones at various locations. In some embodiments, access manager 210 can distribute access data passively, as it is requested by various applications. Additionally, or alternatively, access manager 210 can push access data to applications and movable objects. In various embodiments, an authentication service 212 can be used to authenticate and/or verify the identities of users, applications, and/or movable objects.

Figure 3:
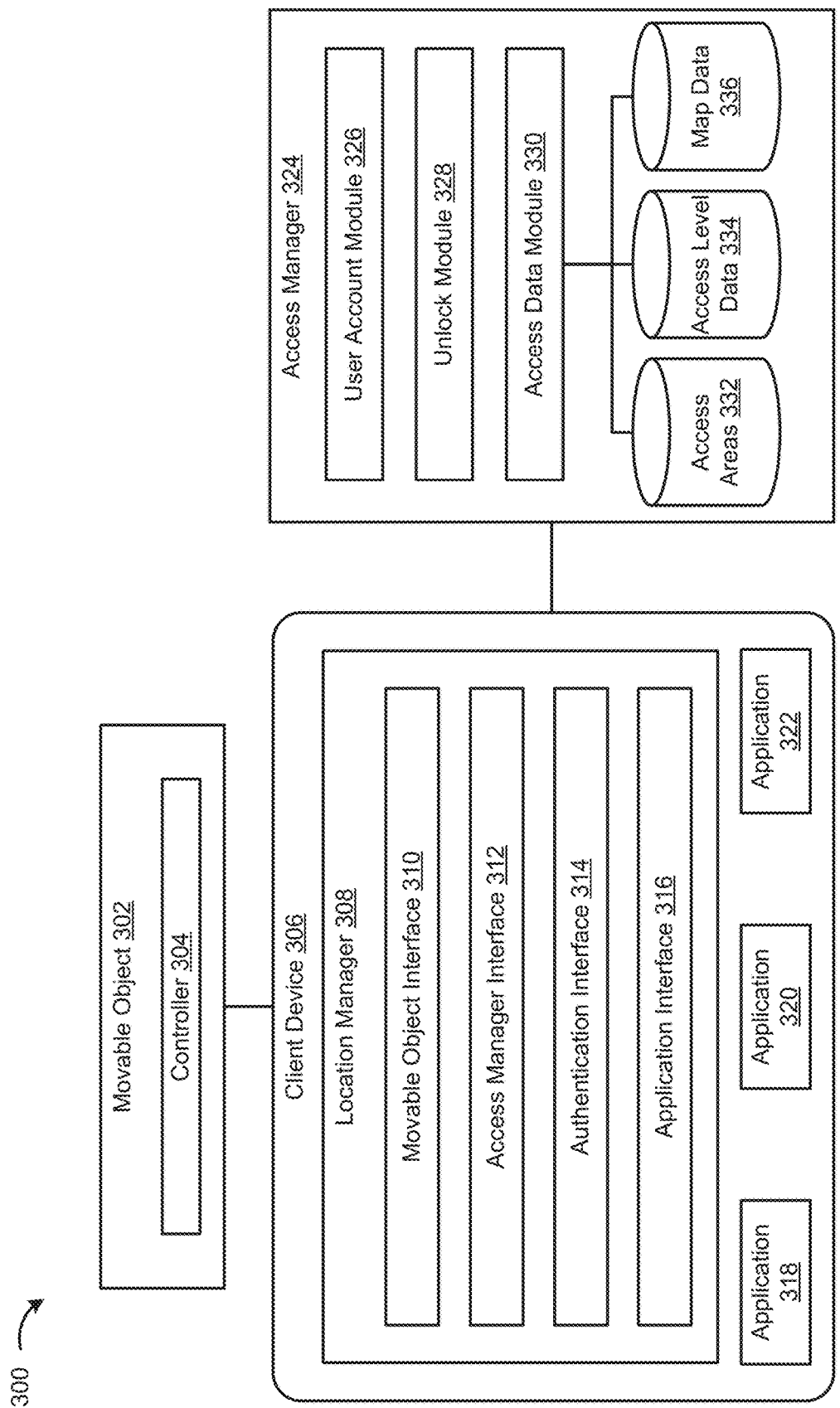
FIG. 3 illustrates an example of a location manager and an access manager in a movable object environment, in accordance with various embodiments of the present disclosure.

FIG. 3 illustrates an example 300 of a location manager and an access manager in a movable object environment, in accordance with various embodiments of the present disclosure. A movable object 302 can include an unmanned aircraft, an unmanned vehicle, a handheld device, and/or a robot. Movable object 302 can include a controller 304, such as a flight controller, that can control the navigation of the movable object and limit the movement of the movable object based on geo-fencing data (e.g., access data) received from an access manager through a location manager.

Movable object 302 can receive instructions from client device 306. Client device 306 can include a desktop or laptop computer, tablet computer, smartphone, or other mobile device, wearable computer, virtual reality system, or other client device. Client device 306 can include a location manager 308. Although the embodiment shown in FIG. 3 shows location manager 308 deployed to client device 306, in some embodiments, location manager 308 can be deployed to one or more servers and manage location access services for multiple client devices. In some embodiments location manager 308 can be part of a software development kit (SDK), or mobile SDK, which is used for supporting the development of software applications in the movable object environment 300. Location manager 308 can include several interfaces to communicate with other systems in the movable object environment. For example, a movable object interface 310 can facilitate communication with movable object 302, access manager interface 312 can facilitate communication with access manager 324, authentication interface 314 can facilitate communication with an authentication service, and application interface 316 can enable various applications 318, 320, 322, to utilize location access management services provided by location manager 308 and access manager 324. Location manager 308 can be configured to communicate with various applications executing on client device 306. Although three applications are shown, embodiments of the present disclosure may support more or fewer applications. In some embodiments, applications 318, 320, 322 can each be developed by the same or different application developers and can each be configured by its developer to communicate with the movable object 302 and access manager 324 using the location manager 308.

Access manager 324 can include user account module 326, an unlock module 328, and an access data module 330. When a request to unlock a region is received, user account module 326 can determine whether the request is from a verified user. If not, the user can be verified, as further discussed herein. If the user is verified, unlock module 328 can unlock the region. In some embodiments, the request can include a region identifier. The unlock module can update a data structure representation of the region corresponding to the region identifier to indicate it is unlocked. For example, access data module 330 can retrieve the corresponding data structure to the region identifier from access area data store 332. Unlock module 328 can update the data structure and return the updated data structure to the application and/or movable object through the location manager. In some embodiments, access data module 330 can be used to define custom access levels 334, such as what credentials are required to access a particular area, or to modify existing levels. In some embodiments, access data module 330 can identify regions close to position data received from movable object 302 using map data 336.

Figure 4:
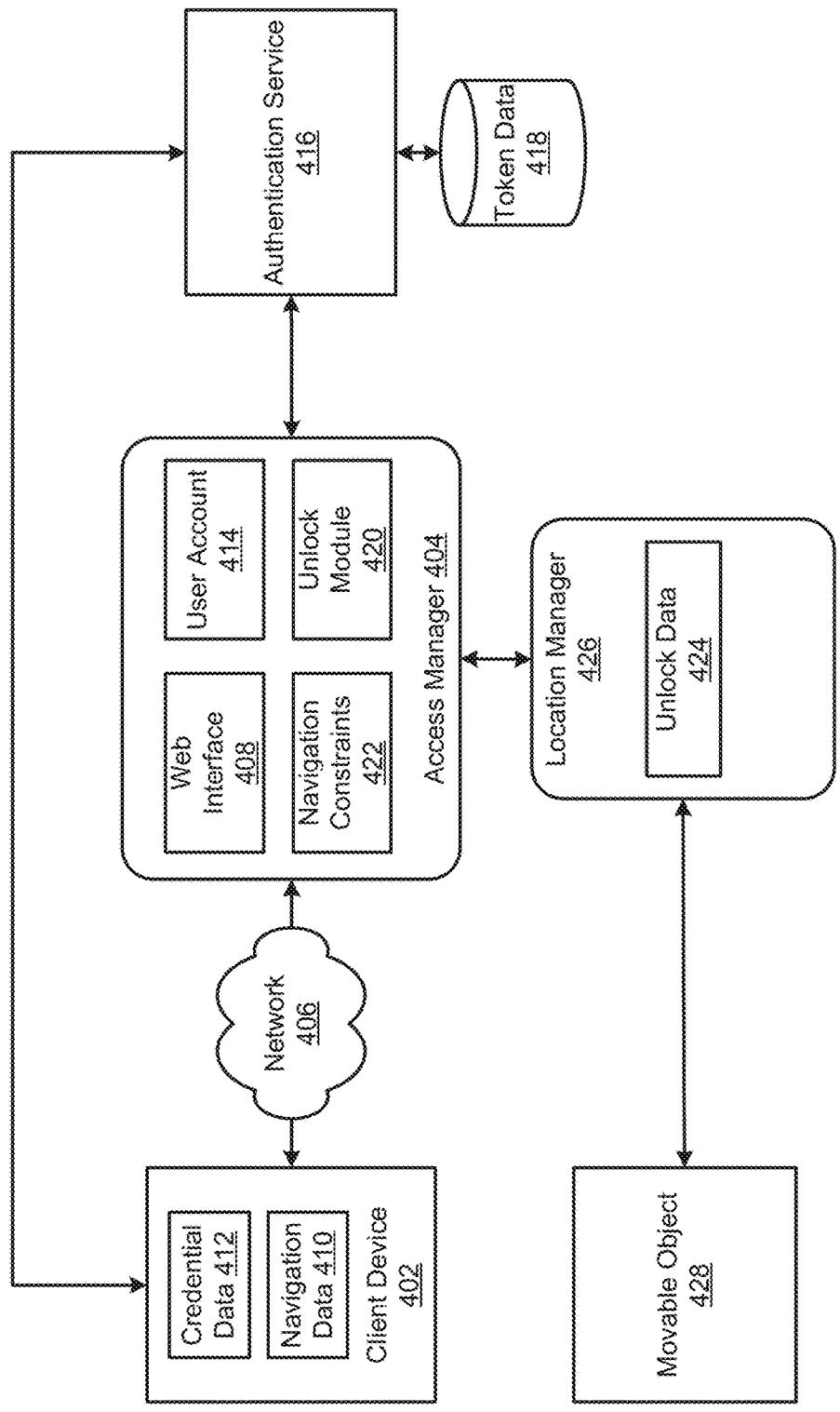
FIG. 4 illustrates an example of prospectively requesting access to locations in a movable object environment, in accordance with various embodiments of the present disclosure.

FIG. 4 illustrates an example 400 of prospectively requesting access to locations in a movable object environment, in accordance with various embodiments of the present disclosure. As described above, if the movable object encounters a restricted area, an unlock process can be performed to gain access to the restricted area. However, if there is no network connectivity (e.g., Internet connection, mobile network connection, or other network connection), the movable object or application may not be able to connect to the access manager to initiate the unlock process. Accordingly, unlock requests can be made in advance while a user has network connectivity.

As shown in FIG. 4, a client device 402 can connect to an access manager 404 over network 406. Access manager 404 can include a web interface 408 which can be accessed, e.g., using a web browser on client device 402. In some embodiments, the client device 402 can be associated with a location manager, e.g., the location manager can be installed on client device 402, and the client device can access the access manager through the location manager. Additionally, or alternatively, the client device 402 can connect to the access manager 404 through the web interface 408 and cause the access manager to communicate with a movable object through a location manager associated with the client device (e.g., executing on the client device or other computing device). An unlock request can be sent to access manager 404 through web interface 408. The unlock request can include navigation data 410 describing a planned route and login information and/or credential data 412 for the user. User account module 414 can determine whether the user's account is verified. If the account is not verified, the credential data 412 can be sent to authentication service 416 for verification. In some embodiments, client device can connect directly to authentication service 416 to send the credential data 412, enabling the credential data to bypass the access manager. In some embodiments, the credential data 412 can include a payment card number, a bank account number, a phone number, or other identification number. Because credential data can include sensitive data, in some embodiments, authentication service 416 can create a token corresponding to the credential data (e.g., by calculating a hash value, or other cryptographic value, for the credential data). Authentication service 416 can store the tokens in token data 418. In some embodiments, token data 418 can map tokens to credential data and/or user account information.

Once the user account is verified, an unlock module 420 can identify one or more unlockable regions in the navigation data 410 and unlock the one or more unlockable regions. To unlock a region, a corresponding data structure that represents the unlockable region can be updated to indicate that the region is unlocked. In some embodiments, one or more navigation constraints 422 can be applied to the unlocked regions. The access manager can send unlock data 424, including updated data structures for the unlocked regions and the navigation constraints, to location manager 426. The unlock data 424 can be sent to movable object 428 to enable the movable object to access the unlocked regions at a later time.

In some embodiments, the navigation constraints may define conditions under which the regions may be unlocked prospectively. For example, the regions may be unlocked for a limited time. Additionally, or alternatively, the region can be unlocked as the movable object approaches the region according to the navigation data. For example, the navigation data can include a plurality of waypoints that define the planned route. If the movable object approaches the unlockable region along the route identified by the waypoints then the unlockable region can be unlocked. If the movable object approaches the unlockable region from a different route, the region may not be unlocked.

FIG. 5 illustrates an example data structure 500 representing locations where access is managed in a movable object environment, in accordance with various embodiments of the present disclosure. As shown in FIG. 5, a data structure can be used to represent a geo-fence area. Although a specific data structure example is shown in FIG. 5, alternative data structures may also be used in accordance with various embodiments of the present disclosure. For example, an alternative data structure may include more or fewer fields, different fields, different formats, etc.

The data structure 500 can include an area identifier 502 and may include location data such as latitude 504 and longitude 506 coordinates, country code 508, or other location data. In some embodiments, data structure 500 can define temporal restrictions for a geo-fence area. For example, a start time 510 and end time 512 can be defined for a geo-fence area. In some embodiments, start time 510 and end time 512 may represent fixed times on a particular day. Alternatively, start time 510 and end time 512 may define a daily interval during which the geo-fence is active or inactive.

In some embodiments, data structure 500 can include data defining the type 514 of geo-fence area being defined and how the area is to be depicted visually 516. Additionally, or alternatively, data structure 500 can include an access level 518. These features are described further below with respect to FIGS. 6 and 7. In various embodiments, data structure 500 can include data indicating the last update 520. In some embodiments, the last update data 520 can include a pointer to a previous version of the data structure 500. Data structure can also include additional location and/or identification information for the geo-fence area including a city 522 and/or name 524. In some embodiments, the data structure may include points 526 that define the geo-fence area. In some embodiments points 526 may include a plurality of points about the latitude and longitude coordinates which define the contours of the geo-fence area. In some embodiments, points 526 may define a radius of a circular geo-fence area with the latitude and longitude coordinates defining the center of the geo-fence area. Various additional or alternative data defining the geo-fence area may also be included in data structure 500.

FIG. 6 illustrates an example of an access level model 600, in accordance with various embodiments of the present disclosure. As discussed above, various zones may be defined for a geo-fencing system. These zones may generally include an open zone, where access is generally unfettered, a prohibited zone, where access is generally not allowed, and an unlockable zone, where access is restricted and may be allowed if the user has an appropriate credential. However, as shown in FIG. 6, various levels can be defined for a geo-fence area, which may then be assigned using data structure 500 discussed above.

As shown in FIG. 6, various access levels can be defined, depending on application, expected usage area, governmental regulations, etc. As an example, these access levels can include level 0 602. Level 0 is labeled an open zone, where access is generally allowed. In some embodiments, local regulations or other messages related to usage may be sent to a user of a movable object depending on, e.g., usage, local rules, proximity to other zones, etc. These zones may be depicted with a green outline or green overlay indicating that the area is generally accessible. In some embodiments, level 1 604 zones can include authorization zones. These zones may be unlockable if presented with an appropriate credential. These zones may be depicted with a yellow outline, or yellow overlay, indicating that access may be provided. In some embodiments, warning messages can be displayed as a user approaches and/or enters an authorization zone. Level 2 606 may define restricted zones where access is prohibited. In some embodiments, the depicted color of these zones may change if access is granted (e.g., a switch from yellow outlines to green outlines). These zones may not be accessed by movable objects and may be depicted with a red outline or overlay indicating as such.

As discussed, the access level model 600 can be extensible, to include various other levels. The levels may be defined by users, application developers, device administrators, or other entities. For example, level 3 608 zones may include enhanced warning zones. In these zones, access may be generally allowed but a user may have to agree to access terms (e.g., height, speed, or other operating restrictions) before operating in these zones. These zones may also be depicted with a green outline, or overlay, indicating the area is generally accessible.

FIG. 7 illustrates an example of location types and corresponding access levels, in accordance with various embodiments of the present disclosure. As shown in FIG. 7, a given geo-fence area may be associated with a "type" 702 corresponding to what is located within that area. For example, the type may include airports, prisons, schools, power plants, and various other locations as shown in FIG. 7. Each type can include a corresponding code 704 and level 706. These may be used, e.g., to define a geo-fence area using a data structure 500. In some embodiments, a description of the zone 708 associated with the level 706 may be included, as well as the shape 710 for that type. In some embodiments, types may be defined by users, application developers, device administrators, or other entities. Additionally, custom types not shown may also be defined. In some embodiments, a permission hierarchy may be used to determine who may modify existing types based on, e.g., who created the type. For example, a type defined by one user may be modified by another user, whereas a type defined by an administrator may not be modified by a user.

Figure 8:
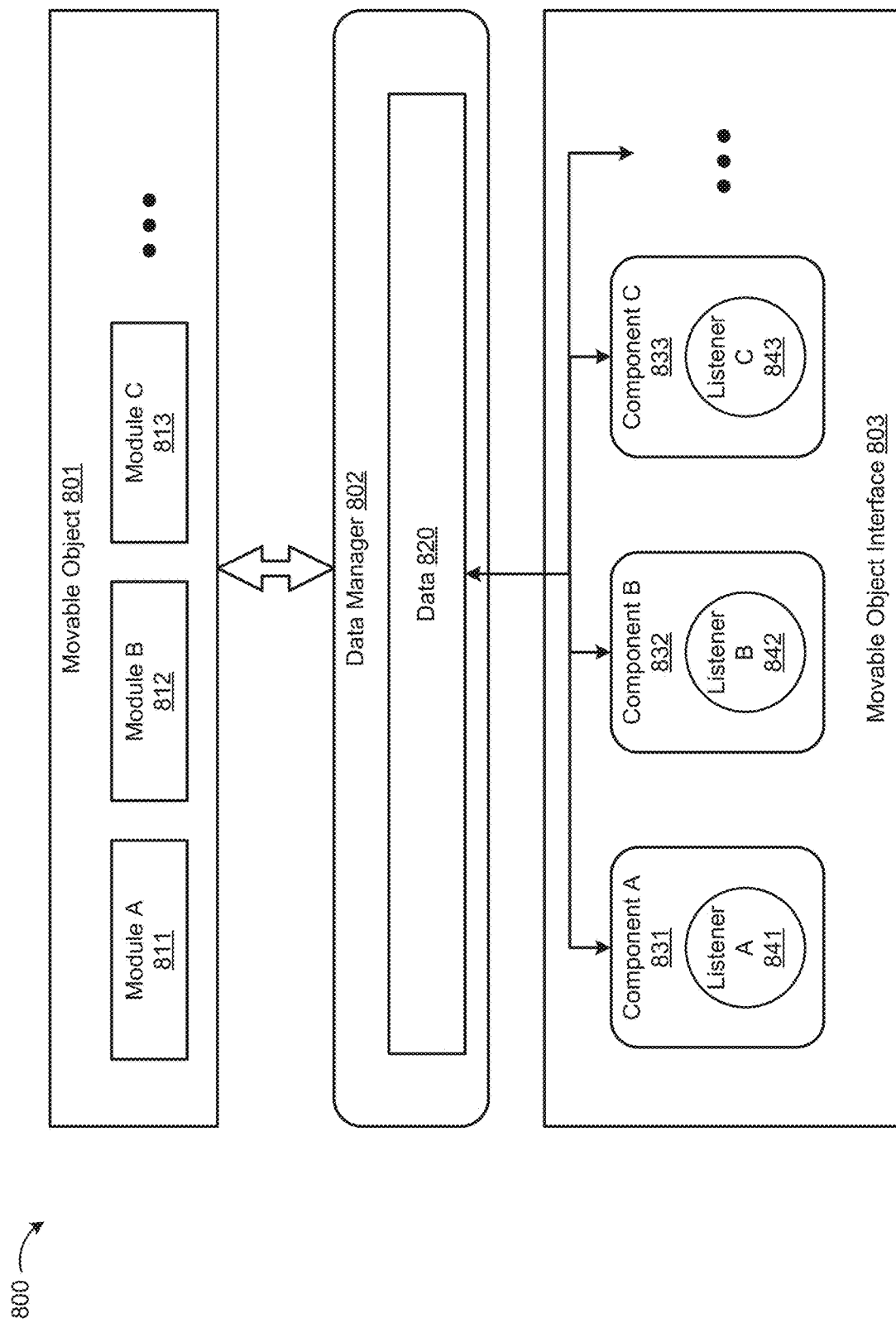
FIG. 8 illustrates an example of supporting a movable object interface in a software development environment, in accordance with various embodiments of the present disclosure.

FIG. 8 illustrates an example of supporting a movable object interface in a software development environment, in accordance with various embodiments of the present disclosure. As shown in FIG. 8, a movable object interface 803 can be used for providing access to a movable object 801 in a software development environment 800, such as a software development kit (SDK) environment. As discussed above, the location manager can be provided as part of an SDK or mobile SDK to enable applications to use location access services provided by the access manager and to communicate with movable objects.

Furthermore, the movable object 801 can include various functional modules A-C 811-813, and the movable object interface 803 can include different interfacing components A-C 831-833. Each of the interfacing components A-C 831-833 in the movable object interface 803 can represent a module A-C 811-813 in the movable object 801.

In accordance with various embodiments of the present disclosure, the movable object interface 803 can provide one or more callback functions for supporting a distributed computing model between the application and movable object 801.

The callback functions can be used by an application for confirming whether the movable object 801 has received the commands. Also, the callback functions can be used by an application for receiving the execution results. Thus, the application and the movable object 801 can interact even though they are separated in space and in logic.

As shown in FIG. 8, the interfacing components A-C 831-833 can be associated with the listeners A-C 841-843. A listener A-C 841-843 can inform an interfacing component A-C 831-833 to use a corresponding callback function to receive information from the related module(s).

Additionally, a data manager 802, which prepares data 820 for the movable object interface 803, can decouple and package the related functionalities of the movable object 801. Also, the data manager 803 can be used for managing the data exchange between the applications and the movable object 801. Thus, the application developer does not need to be involved in the complex data exchanging process.

For example, the DJI SDK can provide a series of callback functions for communicating instance messages and for receiving the execution results from an unmanned aircraft. The DJI SDK can configure the life cycle for the DJI callback functions in order to make sure that the information interchange is stable and completed. For example, the DJI SDK can establish connection between an unmanned aircraft and an application on a smart phone (e.g. using an Android system or an iOS system). Following the life cycle of a smart phone system, the DJI callback functions, such as the ones receiving information from the unmanned aircraft, can take advantage of the patterns in the smart phone system and update the statements accordingly to the different stages in the life cycle of the smart phone system.

Figure 9:
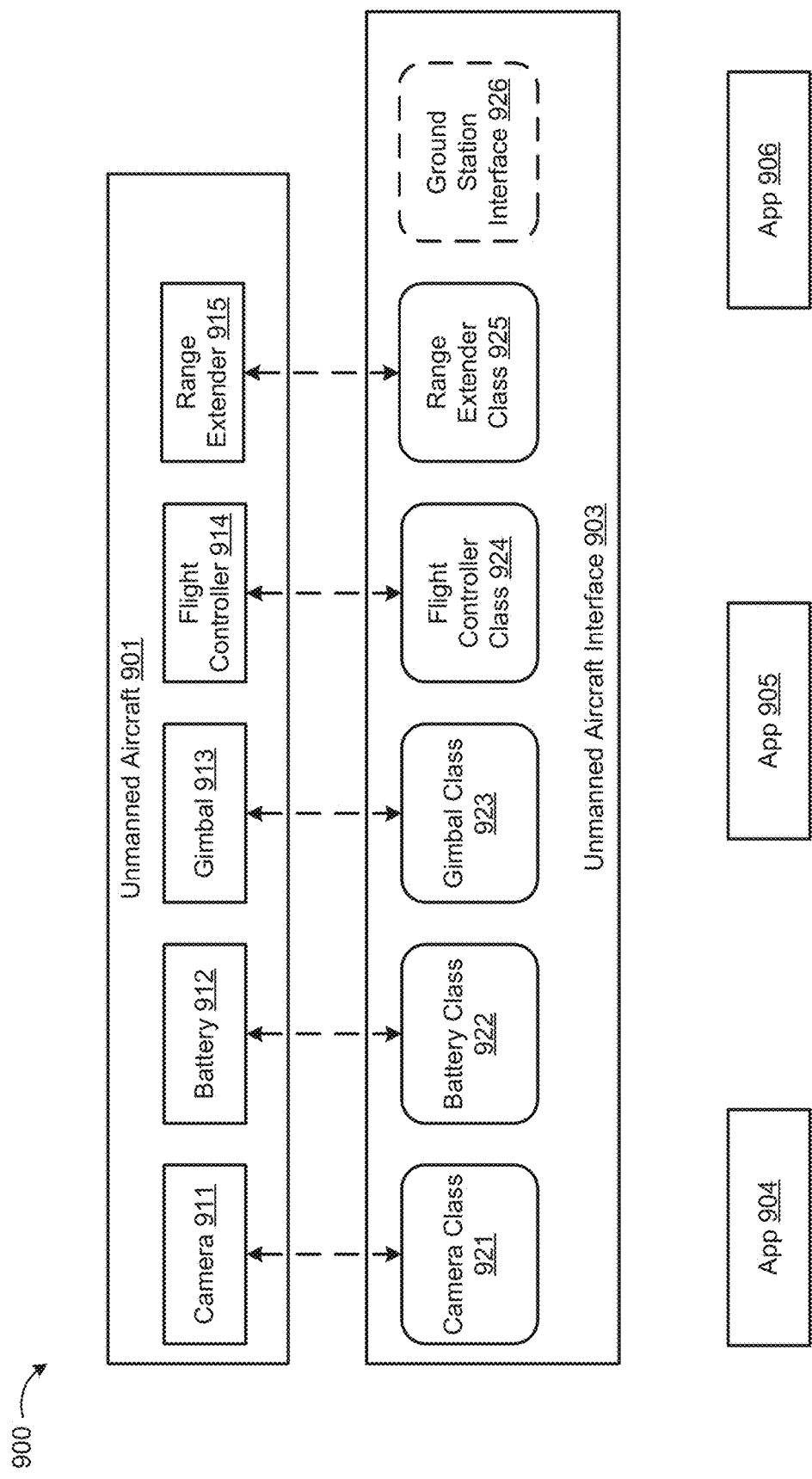
FIG. 9 illustrates an example of an unmanned aircraft interface, in accordance with various embodiments of the present disclosure.

FIG. 9 illustrates an example of an unmanned aircraft interface, in accordance with various embodiments of the present disclosure. As shown in FIG. 9, an unmanned aircraft interface 903 can represent an unmanned aircraft 901. Thus, the applications, e.g. APPs 904-906, in the unmanned aircraft environment 900 can access and control the unmanned aircraft 901.

For example, the unmanned aircraft 901 can include various modules, such as a camera 911, a battery 912, a gimbal 913, a flight controller 914, and a range extender 915.

Correspondently, the movable object interface 903 can include a camera component 921, a battery component 922, a gimbal component 923, a flight controller component 924 and a range extender component 925.

Additionally, the movable object interface 903 can include a ground station component 926, which is associated with the flight controller component 924. The ground station component operates to perform one or more flight control operations, which may require a high level privilege.

Figure 10:
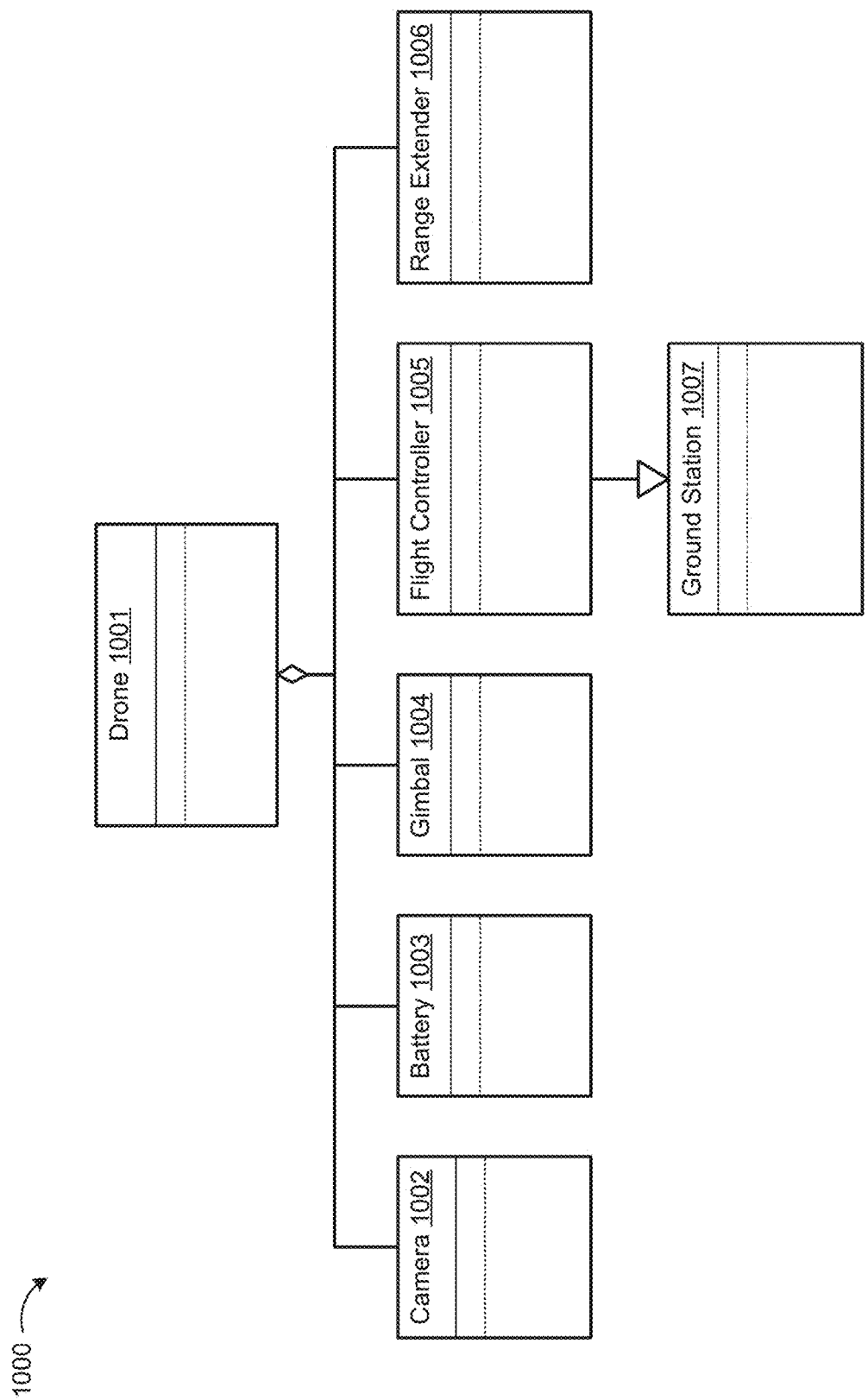
FIG. 10 illustrates an example of components for an unmanned aircraft in a software development kit (SDK), in accordance with various embodiments of the present disclosure.

FIG. 10 illustrates an example of components for an unmanned aircraft in a software development kit (SDK), in accordance with various embodiments of the present disclosure. As shown in FIG. 10, the drone class 1001 in the SDK 1000 is an aggregation of other components 1002-1007 for an unmanned aircraft (or a drone). The drone class 1001, which have access to the other components 1002-1007, can interchange information with the other components 1002-1007 and controls the other components 1002-1007.

In accordance with various embodiments of the present disclosure, an application may be accessible to only one instance of the drone class 1001. Alternatively, multiple instances of the drone class 1001 can present in an application.

In DJI SDK, an application can connect to the instance of the drone class 1001 in order to upload the controlling commands to the unmanned aircraft. For example, an appropriate place in the DJI SDK for establishing the connection to the unmanned aircraft is the OnCreate( ) method in the MainActivity class. Also, the DJI SDK can disconnect the connection to the unmanned aircraft in the OnDestory( ) method in the MainActivity class. After connecting to the unmanned aircraft, the developer can have access to the other classes (e.g. the camera class 1002 and the gimbal class 1004). Then, the drone class 1001 can be used for invoking the specific functions, e.g. providing access data which can be used by the flight controller to control the behavior, and/or limit the movement, of the unmanned aircraft.

In accordance with various embodiments of the present disclosure, an application can use a battery class 1003 for controlling the power source of an unmanned aircraft. Also, the application can use the battery class 1003 for planning and testing the schedule for various flight tasks.

As battery is one of the most restricted elements in an unmanned aircraft, the application may seriously consider the status of battery not only for the safety of the unmanned aircraft but also for making sure that the unmanned aircraft can finish the designated tasks. For example, the battery class 1003 can be configured such that if the battery level is low, the unmanned aircraft can terminate the tasks and go home outright.

Using the DJI SDK, the application can obtain the current status and information of the battery by invoking the get( ) function in the DJI Drone Battery Class. Also, the application can use the set( ) functions for controlling the frequency of the feedbacks.

In accordance with various embodiments of the present disclosure, an application can use a camera class 1002 for defining various operations on the camera in a movable object, such as an unmanned aircraft. For example, in DJI SDK, the DJI Camera Class includes functions for receiving media data in SDcard, getting & setting photo parameters, taking photo and recording videos.

An application can use the camera class 1002 for modifying the setting of photos and records. For example, the developer can use setCameraPhotoSize( ) method for adjusting the size of photos taken. Also, an application can use a media class for maintaining the photos and records.

In accordance with various embodiments of the present disclosure, an application can use a gimbal class 1004 for controlling the view of the unmanned aircraft. For example, the DJI Gimbal Class can be used for configuring an actual view, e.g. setting a first personal view of the unmanned aircraft. Also, the DJI Gimbal Class can be used for automatically stabilizing the gimbal, in order to be focused on one direction. Also, the application can use the DJI Gimbal Class to change the angle of view for detecting different objects.

In accordance with various embodiments of the present disclosure, an application can use a flight controller class 1005 for providing various flight control information and status about the unmanned aircraft. As discussed, the flight controller class can include functions for receiving and/or requesting access data to be used to control the movement of the unmanned aircraft across various regions in an unmanned aircraft environment.

Using the DJI Main Controller Class, an application can monitor the flight status, e.g. using instant messages. For example, the callback function in the DJI Main Controller Class can send back the instant message every one thousand milliseconds (1000 ms).

Furthermore, the DJI Main Controller Class allows a user of the application to investigate the instance message received from the unmanned aircraft. For example, the pilots can analyze the data for each flight in order to further improve their flying skills.

In accordance with various embodiments of the present disclosure, an application can use a ground station class 1007 to perform a series of operations for controlling the unmanned aircraft.

For example, the DJI SDK may require applications to have a SDK-LEVEL-2 key for using the DJI Ground Station Class. The DJI Ground Station Class can provide one-key-fly, on-key-go-home, manually controlling the drone by app (i.e. joystick mode), setting up a cruise and/or waypoints, and various other task scheduling functionalities.

In accordance with various embodiments of the present disclosure, an application can use a communication component, such as a range extender class 1006, for establishing the network connection between the application and the unmanned aircraft.

Figure 11:
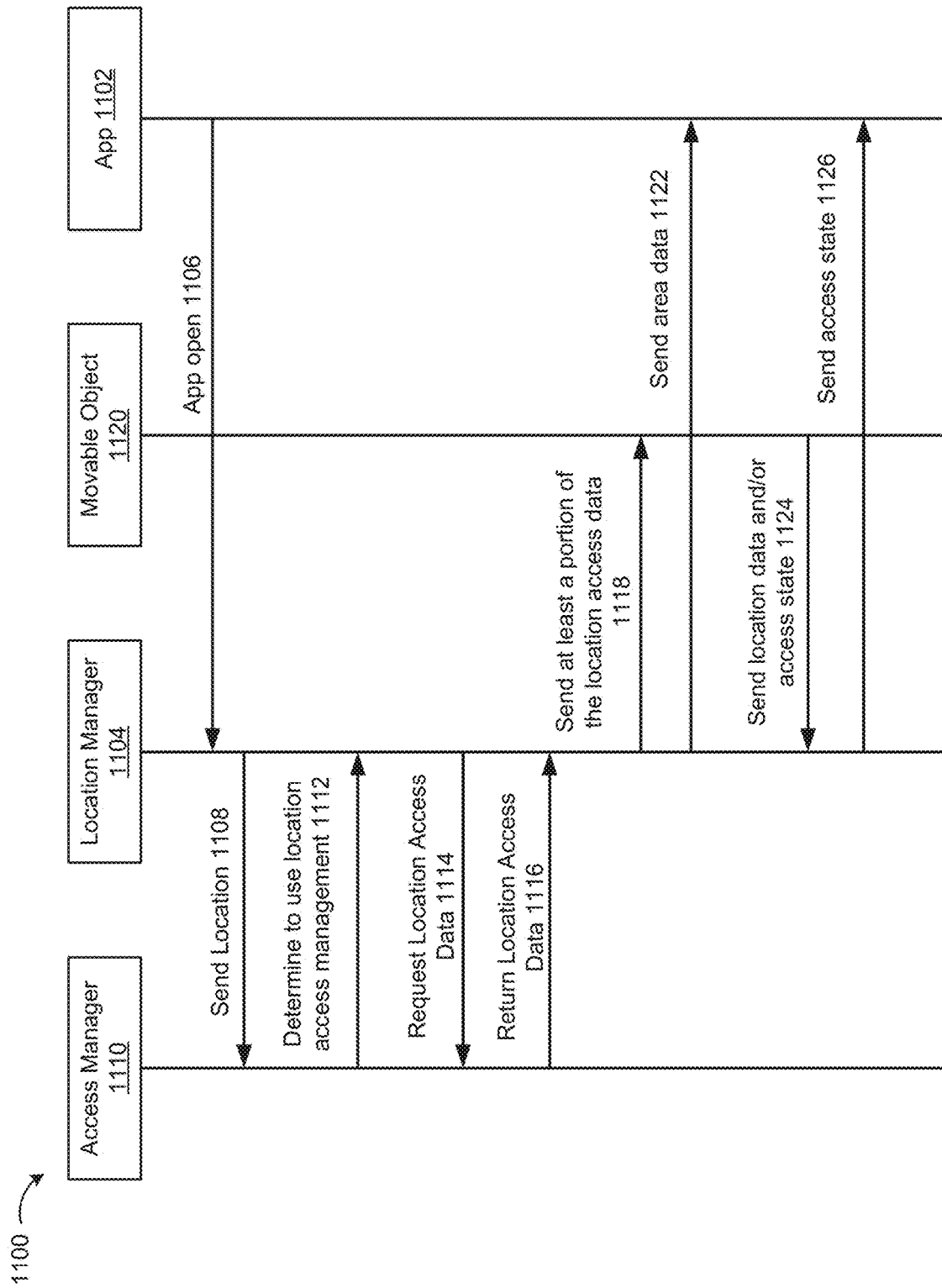
FIG. 11 illustrates a sequence diagram of a process of requesting access data by an application using a location manager in a movable object environment, in accordance with various embodiments of the present disclosure.

FIG. 11 illustrates a sequence diagram 1100 of a process of requesting access data by an application using a location manager in a movable object environment, in accordance with various embodiments of the present disclosure. As shown in FIG. 11, an app 1102 can access a location manager 1104 when the app is opened 1106. As discussed, the app 1102 can include various applications, executing on a client device, which can be used with a movable object. App 1102 can be configured to access location manager 1104 at startup to ensure geo-fencing data for the app is up to date.

Location manager 1104 can send location data 1008 to an access manager 1110. As discussed, the location data can include GPS or other position data obtained from app 1102, the movable object, the client device, a remote control, or any other device in communication with location manager 1104. Access manager 1110 can determine whether to provide access data 1112 based on the location data received at 1108. In some embodiments, access manager 1110 can identify areas that are within a threshold distance of the position of the movable object indicated in the location data. The threshold distance may be a fixed value, may be based on a current range of the movable object, and/or may be based on the available memory space of the movable object. For example, if the areas within range of the movable object are all the same zone (e.g., open) then the access manager 1110 can send a message to the location manager 1104 indicating that the access data is up to date, and the process can terminate.

In various embodiments, if access manager 1110 determines to provide access data, access manager 1110 can send a message 1112 to location manager indicating that the access data is going to send updated access data. For example, the message may indicate that the current access data is not up to date or that an update is otherwise needed. In some embodiments, location manager 1104 can send a request for access data updates 1114. Access manager 1110 can return location access data 1116 to the location manager 1104. As discussed, the access data can include one or more data structures representing various areas within range of the movable object. Location manager 1104 can send 1118 at least a portion of the access data to movable object 1120. In some embodiments, location manager 1104 may only send access data corresponding to level 1 and level 2 areas to the movable object. Location manager 1104 can also send 1122 at least a portion of the access data to the app 1102. The portion of the access data to the app 1102 can include data that indicates how regions should be visually represented by the app. For example, the location, shape, color, etc. of the regions can be sent to the app to be rendered on a display connected to a client device.

Using the access data, the movable object 1120 can determine an access state based on the location of the movable object. For example, if the movable object is in an open area, the access state can indicate that the movable object is ready to operate. If the movable object is in a restricted or prohibited area, the access state can indicate that the movable object is cannot operate without additional information (e.g., for restricted areas) or that the movable object cannot be operated (e.g., for prohibited areas). The movable object can send its location and/or access state 1124 to location manager 1104. In some embodiments, movable object 1120 can return its location to location manager 1104 and the location manager can determine the movable object's access state. The location manager can send 1126 the access state to the app 1102 to be displayed. In some embodiments, the app 1102 can display a message indicating, or based on, the access state. For example, the app 1102 may display a message requesting additional information from the user related to the access state, as discussed further below with respect to FIG. 12.

Figure 12:
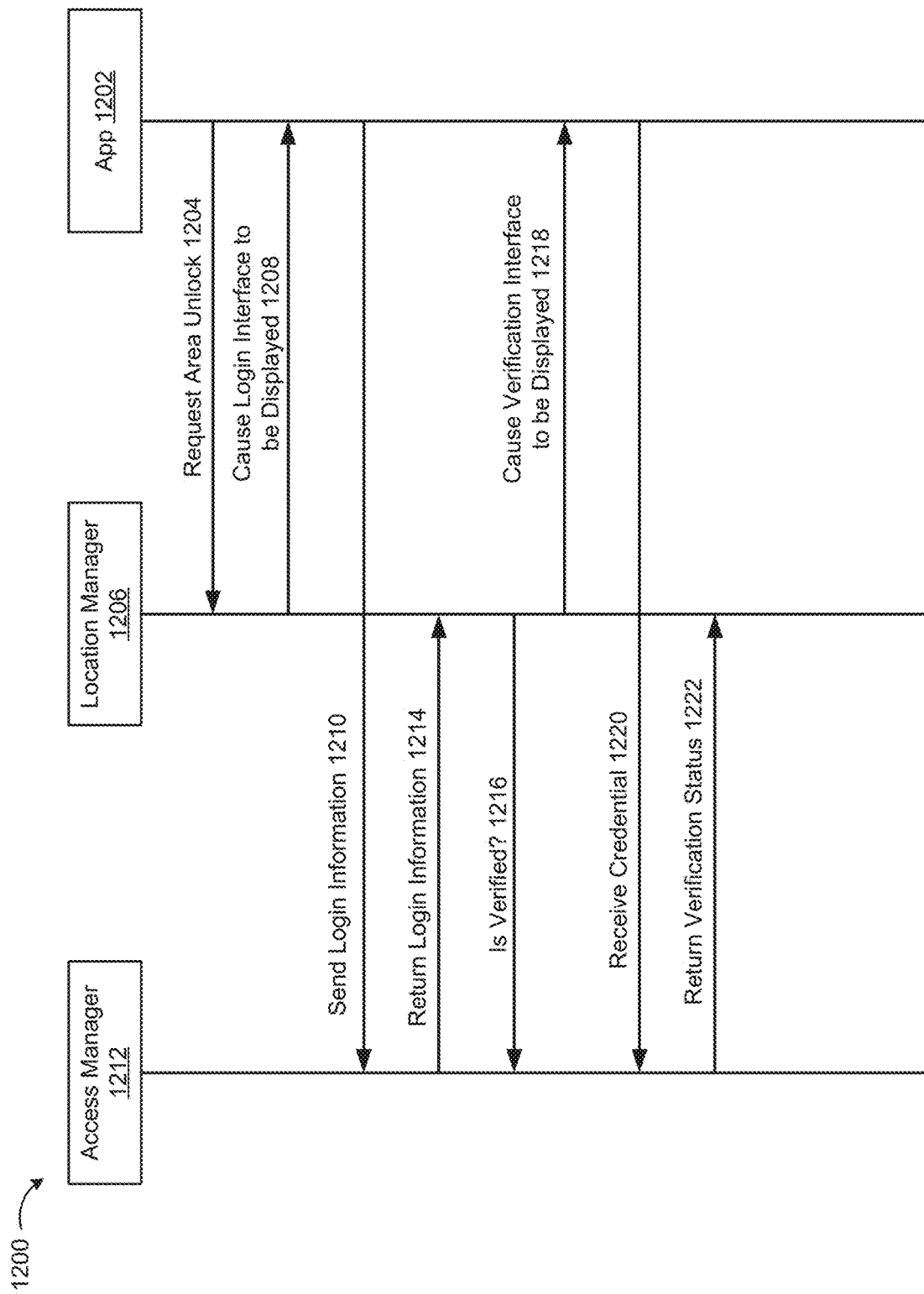
FIG. 12 illustrates a sequence diagram of a process of user verification in a movable object environment, in accordance with various embodiments of the present disclosure.

FIG. 12 illustrates a sequence diagram 1200 of a process of user verification in a movable object environment, in accordance with various embodiments of the present disclosure. As discussed, some regions with restricted access can be unlockable, enabling users to gain access by providing a credential. As shown in FIG. 12, an app 1202 can send a request 1204 to a location manager 1206 to unlock a restricted region. The location manager 1204 can cause a login interface to be displayed 1208 by app 1202. As discussed, the login interface can receive login information from a user and send 1210 the login information (e.g., username and password) to an access manager 1212. The access manager can use the login information to retrieve user account information. The access manager can return a login status 1214 to the location manager. If the login information is incorrect, the location manager can cause the app 1202 to display a login failure message and request corrected login information.

As discussed, a user can verify their account by providing various credentials, such as a payment card number, bank account number, phone number, or other credential. If the user has provided appropriate credential data, a token representing the credential data may be stored in the user's account with an indication that the user's account is verified. If the login was successful at 1214, the location manager can send a message 1216 to the access manager to determine whether the user's account is verified. If the user's account is verified, the unlock process can proceed as shown in FIG. 13.

If the user's account is not verified, the location manager can cause a verification interface to be displayed 1218 by app 1202. The user can provide credential data using the verification interface and the credential data can be sent 1220 to access manager 1212. In some embodiments, the credential data can be sent directly to an authentication service without passing through app 1206 or access manager 1212. In some embodiments, the location manager 1206 return the verification status 1222 to the access manager 1212. As discussed, in some embodiments, the credential data can be converted into a token, e.g., using a hash or other cryptographic function, and the token can be returned to location manager 1204, indicating that the account is verified. In some embodiments, different credential data may result in different verification levels and/or provide access to different regions. For example, a phone number may provide access to one level of restricted areas, while a payment card number may provide access to a different level of restricted areas. In some embodiments, a location where access is prohibited may provide a credential that enables users to access that location. For example, a military base may provide a military credential enabling military personnel to access the location.

Figure 13:
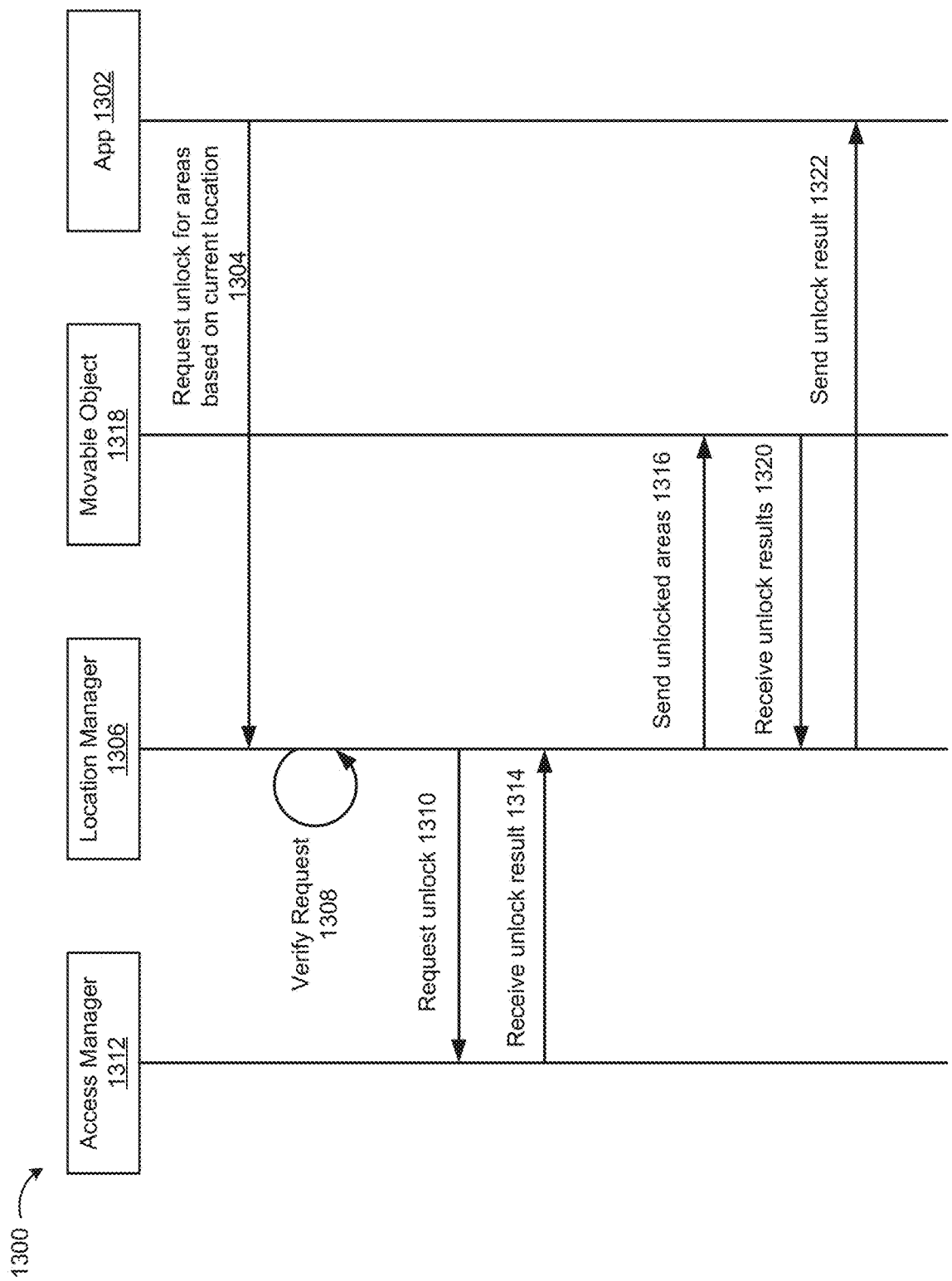
FIG. 13 illustrates a sequence diagram of a process unlocking a location in a movable object environment, in accordance with various embodiments of the present disclosure.

FIG. 13 illustrates a sequence diagram 1300 of a process unlocking a location in a movable object environment, in accordance with various embodiments of the present disclosure. As discussed, multiple levels of restriction may be defined for different areas. For example, in an open zone a user may be able to operate a movable object as desired. In a warning zone, e.g., due to proximity to more restricted areas, a message may be displayed to remind users. Similarly, an enhanced warning zone may display a reminder to users and request acknowledgement of local regulations or limitations applied to movable objects in the area. In restricted areas that cannot be unlocked, a message can be displayed indicating that the user is in a prohibited area and that the movable object cannot be operated. However, some restricted areas can be unlocked with appropriate verification. When it is determined the movable object is in or near such an unlockable region, an unlock process can be performed. In some embodiments, a threshold distance can be defined for a restricted region where if the movable object is determined to be within the threshold distance of the restricted region, the unlock process is started.

As shown in FIG. 13, app 1302 can send 1304 a request to unlock areas based on a current location of a movable object to a location manager 1306. The location manager can determine 1308 whether the request is from a verified user. Although the embodiment of FIG. 13 requires a user to be verified to unlock a region, in some embodiments, a user may merely be required to have an account with a service provider, location owner, or other entity. Once it is determined that the user's account is verified, the location manager 1306 can send a request 1310 to access manager 1312 to unlock the region. In some embodiments, the request can include the credential data or a token representing the credential data, a user account identifier, a movable object identifier, location data, or any other data. In some embodiments, the access manager 1312 can determine if the user account is authorized to unlock the region (e.g., by verifying the credential data and/or token). The access manager can then send an unlock result 1314 to the location manager. If the unlock request is denied, the location manager can cause the app to display a message indicating that the region could not be unlocked and the movable object cannot be operated.

If the unlock request is approved, unlocked area data 1316 can be sent to movable object 1318. In some embodiments, the unlocked area data 1316 can include an updated data structure indicating that the area has been unlocked. The data structure can include any constraints on the unlocked region. For example, the region may have only been unlocked for a limited amount of time. Movable object 1318 can confirm receipt 1320 of the unlocked area data and location manager 1306 can send a request 1322 to app 1302 to display a message indicating that the unlock request was successful. In some embodiments, the message can also indicate any constraints on the unlocked area, such as a limited unlock time.

Figure 14:
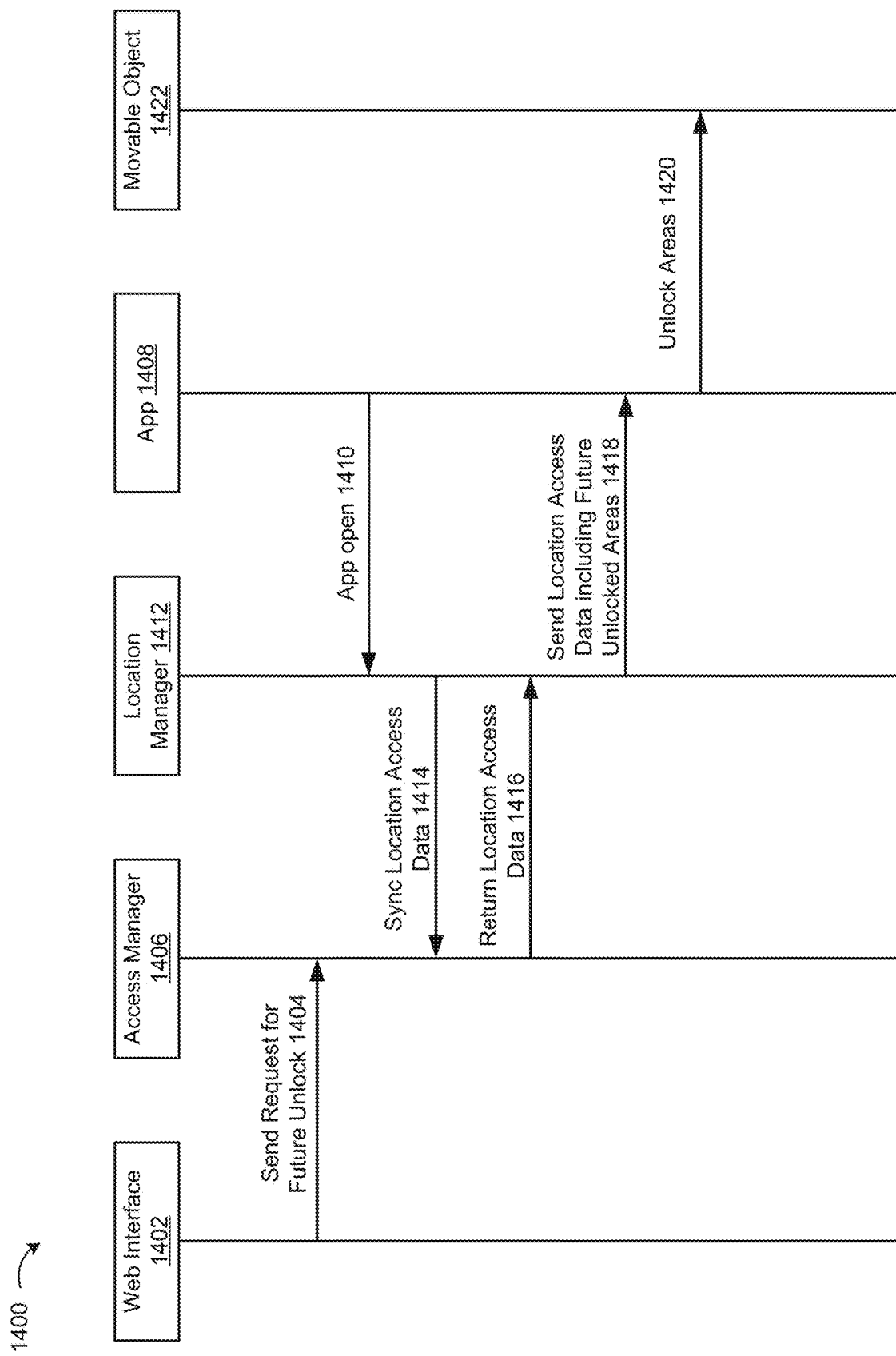
FIG. 14 illustrates a sequence diagram of a process of prospectively unlocking a location in a movable object environment, in accordance with various embodiments of the present disclosure.

FIG. 14 illustrates a sequence diagram 1400 of a process of prospectively unlocking a location in a movable object environment, in accordance with various embodiments of the present disclosure. The process shown above with respect to FIG. 13 can be used to perform unlocking while the movable object is traveling and approaches a restricted area. However, if the movable object is in an area where a connection cannot be made to an access manager, a region that may otherwise be unlockable, may be inaccessible due to a lack of network connectivity. As such, a prospective unlock process is provided.

As shown in FIG. 14, a user can access a web interface 1402 from a client device while a network connection is available. The user can provide navigation data (e.g., a flight plan or other planned route for a movable object). In some embodiments, the navigation data can include a plurality of way points that define a planned path for the movable object through a given area. The planned path may cross one or more restricted regions that are unlockable. Through web interface 1402, the navigation data can be sent 1404 in a request to unlock the one or more restricted regions to access manager 1406. Access manager can perform an unlock process, such as shown above with respect to FIG. 13 on the request.

While still in an area with network connectivity, app 1408 can be opened 1410 and connect to location manager 1412. The location manager can then send a request 1414 to synch access data with access manager 1404. If the unlock request was successful, the access manager can return access data 1416 that indicates the one or more restricted regions are unlocked. The location manager 1412 can then send location access data including future unlocked area 1418 to the App 1408. In some embodiments, instead of indicating that the one or more restricted regions are unlocked, the one or more restricted regions may be omitted from the access data entirely, or indicated as being open, thus resulting in unrestricted access to the regions.

The location manager can send 1420 the access data to app 1408, which can send 1422 the access data to the movable object 1424. In some embodiments, the access data can include various constraints on the unlocked region. For example, the region may only be unlocked for a limited period of time, such as a time specified in the navigation data. Additionally, or alternatively, the area may only be unlocked if the movable object travels the route in the navigation data. For example, if one route was submitted in the navigation data but the movable object approaches the restricted area from a different route, the area may not be unlocked.

Figure 15:
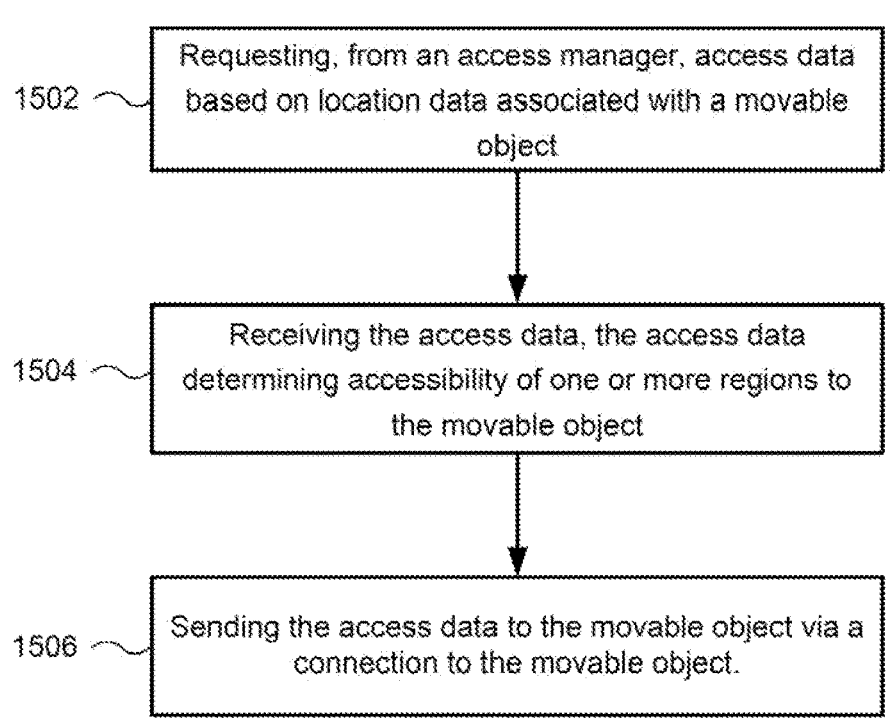
FIG. 15 shows a flowchart of location access management in a movable object environment, in accordance with various embodiments of the present disclosure.

FIG. 15 shows a flowchart 1500 of location access management in a movable object environment, in accordance with various embodiments of the present disclosure. At step 1502, access data can be requested from an access manager based on location data associated with a movable object. At step 1504 the access data can be received. The access data can determine accessibility of one or more regions to the movable object. For example, the access data may include one or more data structures corresponding to regions, as described above, which define an access level for the region.

If the movable object is navigated toward a region having access data indicating the region to be prohibited, a controller on the movable object may prevent the movable object from entering the region, based on the access data. In some embodiments, an application can be caused to render the access data on a display connected to the client device, including rendering graphical representations of the one or more regions.

At step 1506, the access data can be sent to the movable object via a connection to the movable object. In some embodiments, an access level associated with each of the one or more regions can be determined and a subset of the one or more regions can be determined based on the associated access levels. A subset of the access data corresponding to the subset of the one or more regions can be sent to a navigation controller on the movable object. For example, only access data for restricted or prohibited areas may be sent to the movable object. In some embodiments, the access levels can include one or more of open, restricted, or prohibited.

In some embodiments, it can be determined that an access level associated with a region is unlockable. A request may be received to unlock the region. The request can be verified, and the verified request can be sent to the access manager. In some embodiments, to verify the request, a log-in interface can be caused to be displayed in an application. The log-in interface can be configured to receive credential information associated with a user of the application and send the credential information to an authentication service. In some embodiments, the credential information includes a token identifier. An authentication result message can be received from the authentication service. An unlock response granting access to the region can be received from the access manager, and updated access data can be sent to the movable object. In some embodiments, is an unlock response refusing access to the region is received from the access manager, the movable object may be prevented from traveling through the region. Similarly, in some embodiments it may be determined that an access level associated with a current region is not unlockable, and the movable object may be prevented from traveling through the region.

In some embodiments, navigation data identifying a planned route to be traveled by the movable object through an area can be received. At least one region associated with the planned route can be determined. An access level associated with the at least one region can be determined and, prior to traveling through the area, an unlock request for the at least one region can be sent. For example, this enables areas where Internet or other network connectivity is unavailable to be unlocked in advance. An unlock response granting access to the at least one region can be received. In some embodiments, the unlock response including at least one constraint, such as at least one of a temporal constraint, a user profile constraint, or a movable object identifier constraint.

In some embodiments, location access can be managed for an unmanned aerial vehicle (UAV). Position data can be received corresponding to a location of the UAV. Geo-fencing data can be obtained based on the position data from an access manager. The geo-fencing data can be sent to the UAV via a connection to the UAV. An access state associated with the UAV can be obtained. In some embodiments, at least one of the access manager, location manager, and UAV can determine the access state based on the geo-fencing data and the position data. The access state can indicate an access level of a current location of the UAV. The access state can be sent to an application executing on a client device, and the application can be caused to display a message based on the access state. For example, if the UAV is in a restricted area, the application can be caused to display a message indicating that the UAV cannot be operated. If the UAV is in an unlockable area, the message may include a selectable option to begin an unlock process.

Many features of the present disclosure can be performed in, using, or with the assistance of hardware, software, firmware, or combinations thereof. Consequently, features of the present disclosure may be implemented using a processing system (e.g., including one or more processors). Exemplary processors can include, without limitation, one or more general purpose microprocessors (for example, single or multi-core processors), application-specific integrated circuits, application-specific instruction-set processors, graphics processing units, physics processing units, digital signal processing units, coprocessors, network processing units, audio processing units, encryption processing units, and the like.

Features of the present disclosure can be implemented in, using, or with the assistance of a computer program product which is a storage medium (media) or computer readable medium (media) having instructions stored thereon/in which can be used to program a processing system to perform any of the features presented herein. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the machine readable medium (media), features of the present disclosure can be incorporated in software and/or firmware for controlling the hardware of a processing system, and for enabling a processing system to interact with other mechanism utilizing the results of the present disclosure. Such software or firmware may include, but is not limited to, application code, device drivers, operating systems and execution environments/containers.

Features of the disclosure may also be implemented in hardware using, for example, hardware components such as application specific integrated circuits (ASICs) and field-programmable gate array (FPGA) devices. Implementation of the hardware state machine so as to perform the functions described herein will be apparent to persons skilled in the relevant art.

Additionally, the present disclosure may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

While various embodiments of the present disclosure have been described above, it should be understood that they have been presented by way of example, and not limitation. It will be apparent to persons skilled in the relevant art that various changes in form and detail can be made therein without departing from the spirit and scope of the disclosure.

The present disclosure has been described above with the aid of functional building blocks illustrating the performance of specified functions and relationships thereof. The boundaries of these functional building blocks have often been arbitrarily defined herein for the convenience of the description. Alternate boundaries can be defined so long as the specified functions and relationships thereof are appropriately performed. Any such alternate boundaries are thus within the scope and spirit of the disclosure.

The foregoing description of the present disclosure has been provided for the purposes of illustration and description. It is not intended to be exhaustive or to limit the disclosure to the precise forms disclosed. The breadth and scope of the present disclosure should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the disclosure and its practical application, thereby enabling others skilled in the art to understand the disclosure for various embodiments and with various modifications that are suited to the particular use contemplated. It is intended that the scope of the invention be defined by the following claims and their equivalence.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or as least one of C to each be present.

What is claimed is:

1. A method for providing location access management, comprising:
    requesting, by a location manager, access data with respect to one or more regions based on location data associated with a movable object, the location data indicating a current location of the movable object, the access data including one or more data structures representing the one or more regions that are within a threshold distance of the current location of the movable object;
    receiving the access data for determining accessibility of the one or more regions with respect to the movable object;
    determining that an access level associated with a region of the one or more regions is restricted, the restricted region being unlockable for a predetermined time;
    displaying the access level associated with the restricted region on a user interface;
    receiving, by an access manager, a request to unlock the restricted region, the request including a region identifier associated with the restricted region;
    unlocking, by the access manager, the restricted region;
    updating, by the access manager, a data structure corresponding to the region identifier and representing the restricted region to indicate that the restricted region is unlocked;
    sending, by the access manager, the updated data structure to the location manager to update the access data;
    and sending, by the location manager, the updated access data to the movable object via a connection to the movable object.

2. The method of claim 1, further comprising:
    causing an application to render the access data on a display connected to a client device, including rendering graphical representations of the restricted region.

3. The method of claim 1, further comprising:
sending the access data corresponding to the restricted region to a navigation controller on the movable object.

4. The method of claim 1, wherein verifying the request to unlock the restricted region comprises:
causing a log-in interface to be displayed in an application, the log-in interface configured to receive credential information associated with a user to be verified and send the credential information to an authentication service, wherein the user to be verified uses the application; and
receiving an authentication result message from the authentication service.

5. The method of claim 4, wherein the credential information includes a token identifier.

6. The method of claim 1, further comprising:
verifying the request to unlock the restricted region;
sending an unlock request to the access manager;
receiving, from the access manager, an unlock response refusing access to the restricted region; and
preventing the movable object from traveling through the restricted region.

7. The method of claim 1, further comprising:
receiving navigation data, the navigation data identifying a planned route to be traveled by the movable object through an area; and
determining at least one district associated with the planned route.

8. The method of claim 7, further comprising:
determining an access level associated with the at least one district;
prior to traveling through the area, sending the unlock request for the at least one district; and
after the access manager approves the unlock request, receiving an unlock response granting access to the at least one district, the unlock response including at least one constraint.

9. The method of claim 8, wherein the at least one constraint includes at least one of a temporal constraint, a user profile constraint, or a movable object identifier constraint.

10. The method of claim 1, wherein the movable object is an unmanned aircraft including a flight controller component configured to receive the access data.

11. The method of claim 10, wherein the flight controller component is further configured to perform one or more flight control operations based on navigation commands received from a client device and the access data.

12. The method of claim 1, further comprising:
verifying the request to unlock the restricted region;
receiving, from the access manager, an unlock response granting access to the restricted region; and
updating the access data based on the unlock response to generate the updated access data.

13. A system for providing location access management, comprising:
one or more microprocessors;
a location manager and an access manager, both running on the one or more microprocessors, wherein:
the location manager operates to:
request, from an access manager, access data with respect to one or more regions based on location data associated with a movable object, the location data indicating a current location of the movable object, the access data including one or more data structures representing the one or more regions that are within a threshold distance of the current location of the movable object;
receive the access data determining accessibility of the one or more regions with respect to the movable object;
determine that an access level associated with a region of the one or more regions is restricted, the restricted region being unlockable for a predetermined time;
display the access level associated with the restricted region on a user interface;
and send updated access data to the movable object via a connection to the movable object; and
the access manager operates to:
receive a request to unlock the restricted region, the request including a region identifier associated with the restricted region;
unlock the restricted region;
update a data structure corresponding to the region identifier and representing the restricted region to indicate that the restricted region is unlocked;
and send the updated data structure to the location manager to update the access data.

14. The system of claim 13, wherein the location manager further operates to:
cause an application to render the access data on a display connected to the client device, including rendering graphical representations of the restricted region.

15. The system of claim 13, wherein to send the access data to the movable object, the location manager further operates to:
send the access data corresponding to the restricted region to a navigation controller on the movable object.

16. The system of claim 13, wherein to verify the request to unlock the region, the location manager further operates to:
cause a log-in interface to be displayed in an application, the log-in interface configured to receive credential information associated with a user to be verified and send the credential information to an authentication service, wherein the user to be verified uses the application; and
receive an authentication result message from the authentication service.

17. The system of claim 16, wherein the credential information includes a token identifier.

18. The system of claim 13, wherein the location manager further operates to:
verify the request to unlock the one of the one or more regions;
send an unlock request to the access manager;
receive, from the access manager, an unlock response refusing access to the one of the one or more regions; and
prevent the movable object from traveling through the one of the one or more regions.

19. The system of claim 13, wherein the location manager further operates to:
receive navigation data, the navigation data identifying a planned route to be traveled by the movable object through an area; and
determine at least one district associated with the planned route.

20. The system of claim 19, wherein the location manager further operates to:
determine an access level associated with the at least one district;

prior to traveling through the area, send the unlock request for the at least one district; and after the access manager approves the unlock request, receive an unlock response granting access to the at least one district, the unlock response including at least one constraint.

21. The system of claim 20, wherein the at least one constraint includes at least one of a temporal constraint, a user profile constraint, or a movable object identifier constraint.

22. The system of claim 13, wherein the movable object is an unmanned aircraft including a flight controller component configured to:

receive the access data; and perform one or more flight control operations based on navigation commands received from a client device and the access data.

23. The system of claim 13, wherein the location manager further operates to:

verify the request to unlock the restricted region;

receive, from the access manager, an unlock response granting access to the restricted region; and update the access data based on the unlock response to generate the updated access data.

24. A non-transitory computer-readable storage medium including instructions stored thereon which, when executed by a processor, cause the processor to:

request, by a location manager, access data with respect to one or more regions based on location data associated with a movable object, the location data indicating a current location of the movable object, the access data including one or more data structures representing the one or more regions that are within a threshold distance of the current location of the movable object;

receive the access data for determining accessibility of the one or more regions with respect to the movable object;

determine that an access level associated with a region of the one or more regions is restricted, the restricted region being unlockable for a predetermined time;

display the access level associated with the restricted region on a user interface;

receive a request to unlock the restricted region, the request including a region identifier associated with the restricted region;

unlock the restricted region;

update a data structure corresponding to the region identifier and representing the restricted region to indicate that the restricted region is unlocked;

send the updated data structure to a location manager to update the access data;

and send the updated access data to the movable object via a connection to the movable object.

25. A method for providing location access management, comprising:

receiving position data corresponding to an unmanned aerial vehicle (UAV);

obtaining, by a location manager, geo-fencing data with respect to one or more regions based on the position data, the geo-fencing data including one or more data structures representing the one or more regions that are within a threshold distance of a current location of the UAV according to the position data;

sending the geo-fencing data to the UAV via a connection to the UAV;

obtaining an access state associated with the UAV, the access state indicating an access level of a current location of the UAV;

sending, by the location manager, the access state to an application executing on a client device;

causing the application to display a message based on the access state, wherein the access state indicates that a region of the one or more regions is restricted, the restricted region being unlockable for a predetermined time;

displaying the access level associated with the restricted region on a user interface;

receiving, by the access manager, a request to unlock the restricted region, the request including a region identifier associated with the restricted region;

unlocking, by the access manager, the restricted region;

updating, by the access manager, a data structure corresponding to the region identifier and representing the restricted region to indicate that the restricted region is unlocked;

sending, by the access manager, the updated data structure to the location manager to update geo-fencing data; and sending, by the location manager, the updated geo-fencing data to the UAV via a connection to the UAV.

* * * * *